(12) United States Patent
Mitchell

(10) Patent No.: US 6,973,938 B2
(45) Date of Patent: Dec. 13, 2005

(54) LIQUID COLUMN PRESSURE AND VACUUM VENT

(75) Inventor: Thomas O. Mitchell, St. Louis, MO (US)

(73) Assignee: Husky Corporation, Pacific, MO (US)

( * ) Notice: Subject to any disclaimer, the term of this patent is extended or adjusted under 35 U.S.C. 154(b) by 146 days.

(21) Appl. No.: 10/340,900

(22) Filed: Jan. 14, 2003

(65) Prior Publication Data

US 2004/0134535 A1    Jul. 15, 2004

(51) Int. Cl.$^7$ ............................................. F16K 13/10
(52) U.S. Cl. ............................. 137/247.35; 137/251.1; 137/493.9
(58) Field of Search .......................... 137/246, 247.35, 137/251.1, 493.7, 493.8, 493.9

(56) References Cited

U.S. PATENT DOCUMENTS

| | | | |
|---|---|---|---|
| 90,226 A | | 5/1869 | Boden |
| 165,119 A | | 6/1875 | Prosser |
| 169,805 A | | 11/1875 | Harrison |
| 1,068,904 A | * | 7/1913 | Ionides, Jr. ............... 137/251.1 |
| 1,102,549 A | * | 7/1914 | Rumpf ......................... 137/248 |
| 1,243,604 A | * | 10/1917 | Honeywell ................... 137/252 |
| 1,460,900 A | | 7/1923 | Harris et al. |
| 1,520,583 A | * | 12/1924 | Lockhart .................. 137/251.1 |
| 1,595,668 A | * | 8/1926 | Kuhl ......................... 137/251.1 |
| 1,637,489 A | | 8/1927 | Kuhl |
| 1,651,051 A | * | 11/1927 | Wiggins .................. 137/251.1 |
| 1,858,505 A | | 5/1932 | Jacobi |
| 2,029,955 A | | 2/1936 | Taylor |
| 2,070,204 A | * | 2/1937 | Hetzer ......................... 137/247 |
| 2,086,969 A | | 7/1937 | Strelow |
| 2,152,422 A | | 3/1939 | Tokheim |
| 2,168,891 A | | 8/1939 | Wiggins et al. |
| 2,280,390 A | | 4/1942 | Ensign |
| 2,405,704 A | * | 8/1946 | Matuszak ................. 137/251.1 |
| 2,416,855 A | | 3/1947 | St. Clair |
| 2,575,574 A | * | 11/1951 | Withrow et al. ......... 137/251.1 |
| 2,704,088 A | * | 3/1955 | Nerem ......................... 137/248 |
| 2,735,366 A | | 2/1956 | Hunter |
| 2,839,923 A | * | 6/1958 | Whitworth ............... 137/251.1 |
| 2,971,531 A | | 2/1961 | Jurs et al. |
| 3,180,710 A | * | 4/1965 | Brown et al. ............. 137/251.1 |
| 3,386,468 A | | 6/1968 | Dickinson et al. |
| 3,592,224 A | | 7/1971 | Bois |
| 3,826,277 A | | 7/1974 | Bois |
| 4,131,129 A | * | 12/1978 | Firestone ................. 137/251.1 |
| 4,616,763 A | | 10/1986 | Ruhl |
| 4,716,922 A | | 1/1988 | Camp |
| 5,054,511 A | | 10/1991 | Tuan et al. |

(Continued)

OTHER PUBLICATIONS

Morrison Bros. Co. "A Natural Combination" advertisement introducing the first AST pressure/vacuum vent.

(Continued)

*Primary Examiner*—John Rivell
(74) *Attorney, Agent, or Firm*—Paul M. Denk

(57) ABSTRACT

A pressure and vacuum vent utilizing a column of liquid to open and close the vent at predetermined pressure and vacuum levels. A column of liquid is constrained in connection with internal and external passages coupled between a pair of expansion chambers. The external passage is sized to hold a level of liquid corresponding to a predetermined positive pressure level at which the valve will open, while the internal passage is sized to hold a level of liquid corresponding to a predetermined negative pressure level at which the valve will open. At either the predetermined positive or negative pressure level, the valve opens when sufficient liquid has exited either the external or internal passage to permit the flow of a restrained gas past the liquid column.

3 Claims, 3 Drawing Sheets

U.S. PATENT DOCUMENTS 5,419,366 A    5/1995    Johnston
5,957,157 A    9/1999    Mitchell et al.

OTHER PUBLICATIONS

OPW Fueling Components Jan. 1996 "Instruction Brochure" for the OPW 523 Series 3" W.C. Pressure/8" W.C. Vaccum Pressure/Vacuum Vent.

Petroleum Equipment Manufacturing Company, Inc. Catalogue pp. 21, 36-37.

Morrison Bros. Co. "Product Brochure" 1997.

EBW "Sales Bulletin" Apr. 20, 1998 "New Product Announcement—CARB Certified Pressure Vacuum Vents".

Morrison Bros Co. advertisement in the Aug. 1998 issue of "Petroleum Equipment & Technology" p. 31, "Pressure/Vacuum Vent with built-in overfill alarm.".

OPW Fueling Components advertisement in the Aug. 1998 issue of "Petroleum Equipment & Technology" Journal "Doing It Right; Abovegrougn Storage Tank Products; Top Off Your Tank With OPW AST Products.".

* cited by examiner

LIQUID COLUMN PRESSURE AND VACUUM VENT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to pressure vents for fuel storage tanks and, in particular, to a pressure valve which utilizes a liquid column to respond to both high pressure and low pressure situations in a fuel storage tank.

Conventional pressure and vacuum vents utilize springs, diaphragms, or weights to open and close the valves at a predetermined pressure or vacuum levels. For example, a conventional vent may utilize a number of springs or weights to open the valve at a positive pressure level equivalent to 3.0 inches of water, and at a negative pressure level (vacuum) equivalent to 8.0 inches of water. However, a slight change in the weight or strength of the spring will result in the conventional valve opening either above or below the desired pressure or vacuum setting.

Further, due to the designs, conventional pressure and vacuum vents utilizing springs, weights, or diaphragms have a greatly diminished amount of force holding the valve in the closed position as the pressure or vacuum approaches the predetermined opening levels. As the amount of force holding the valve closed decreases, leakage may occur through the valve. Such designs of particularly susceptible to leakage if dirt or contaminates have collected on the valve seat, preventing the complete closure or sealing thereof.

Accordingly, there is a need in the fuel tank industry for a simple combination pressure and vacuum valve which opens at predetermined high and low pressure levels, and which maintains a consistent seal for intermediate pressures.

BRIEF SUMMARY OF THE INVENTION

Briefly stated, the present invention provides a pressure and vacuum vent which utilizes a column of liquid to open and close the vent at predetermined pressure and vacuum levels. A column of liquid is constrained in a pair of passages coupled between a pair of expansion chambers. The first or external passage is sized to hold a level of liquid corresponding to a predetermined positive pressure level at which the valve will open, while the second or internal passage is sized to hold a level of liquid corresponding to a predetermined negative pressure level at which the valve will open. The liquid utilized in the column may be water, but preferably silicon oil will be used because it does not freeze at normal operating temperatures, and does not react with gasoline vapors. At either the predetermined positive or negative pressure level, the valve opens when sufficient liquid has exited either the external or internal passage to permit the flow of a restrained gas past the liquid column.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
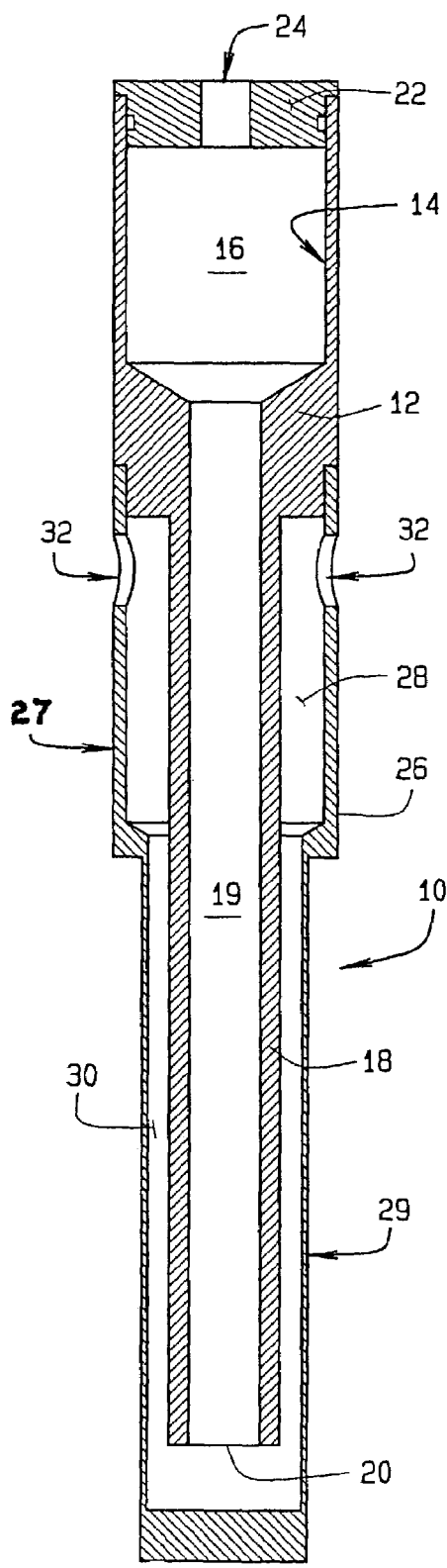
FIG. 1 is a sectional view of the pressure and vacuum valve of the present invention.

Turning to FIG. 1, the pressure and vacuum vent of the present invention is indicated generally at 10. The vent 10 includes a cylindrical body 12 having a central bore 14 defining an internal expansion chamber 16, and an axial tubular extension 18 defining an internal passage 19 in communication with the central bore 14. The internal passage 19 terminates in an opening 20 in the tubular extension 18 opposite the internal expansion chamber 16. An end closure cap 22 is fitted to the axial central bore 14, opposite the tubular extension 18, and includes a vent passage 24 for fluid communication between a first volume of gas and the expansion chamber 16 to the internal passage 19. Those of ordinary skill in the art will recognize that the end closure cap 22 may be configured with a conventional fixture for attachment to a tank or other storage container in which the first volume of gas is contained.

A sleeve 26 is disposed concentrically around the tubular extension 18 and the opening 20, and is secured to the cylindrical body 12. A first portion 27 of the sleeve 26 concentrically disposed about a portion of the tubular extension 18 defines an external expansion chamber 28, while the remaining portion 29 of the sleeve 26, having a reduced diameter, defines an external passage 30 in fluid communication with the internal passage 19 through the opening 20. One or more external vent passages 32 in the first portion 27 provide fluid communication from a second volume of gas, such as the open atmosphere, external to the sleeve 26 through the external expansion chamber 28 to the external passage 30.

Figure 2:
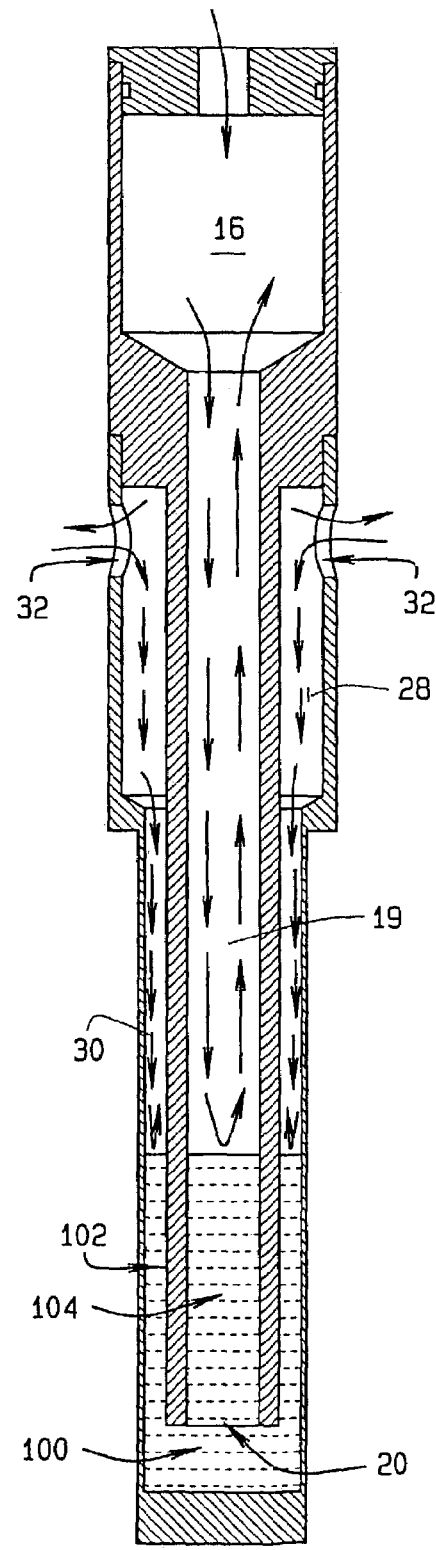
FIG. 2 is a sectional view of the valve of FIG. 1, illustrating the valve in-use in a closed arrangement at balanced pressures.

Turning next to FIG. 2, with the pressure and vacuum vent 10 in a vertical orientation, a predetermined volume of liquid 100 is disposed within the internal passage 19 and the external passage 30, adjacent the opening 20. The liquid 100 defines a pair of liquid columns 102 and 104, each disposed in a respective passage 19, 30, and provides an effective seal against gas communication between the internal passage 19 and the external passage 30. The height of each liquid column 102, 104 within each respective passage 19, 30 is dependant upon the pressure exerted thereupon by the corresponding volumes of gas in fluid communication with each passage 19, 30 through the vent passages 24 and 32.

Figure 3:
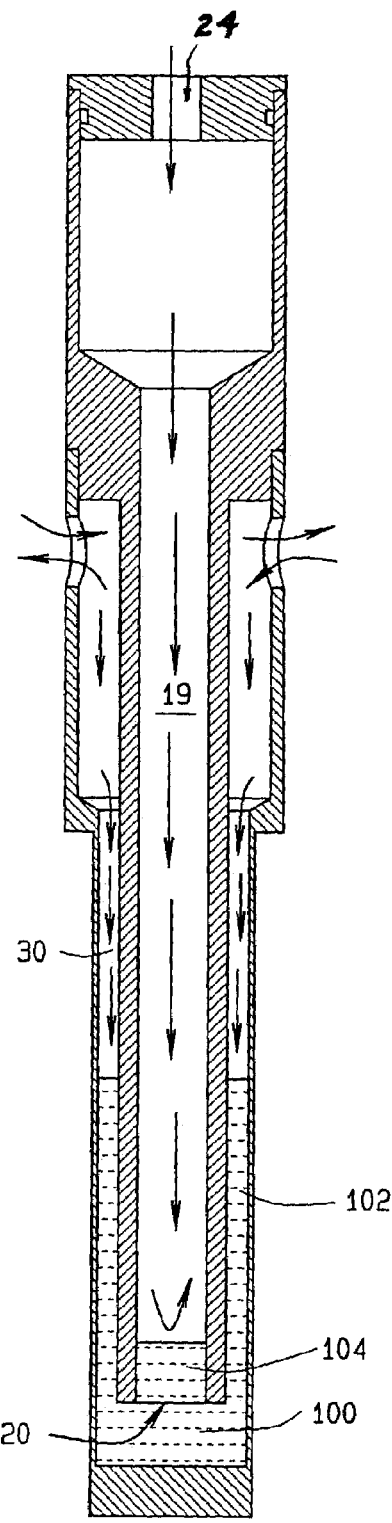
FIG. 3 is a sectional view of the valve of FIG. 1, illustrating the valve in-use in a closed arrangement at a high positive pressure.
Figure 4:
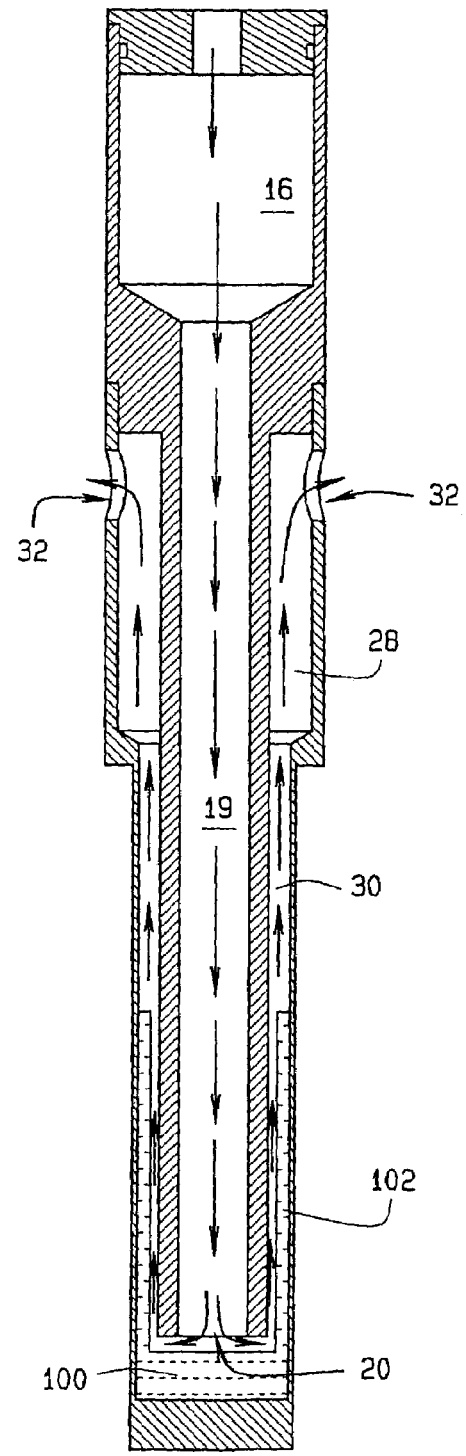
FIG. 4 is a sectional view of the valve of FIG. 1, illustrating the valve in-use in an open configuration at a high positive pressure.

As seen in FIGS. 3 and 4, as the positive pressure exerted upon the liquid column 104 by the first volume of gas in communication with the internal passage 19 through the vent passage 24 increases, the height of the liquid column 104 decreases within the internal passage 19. When the positive pressure has increased sufficiently to evacuate all of the liquid 100 from the internal passage 19, the vent 10 is "open" and gas is released from the internal passage 19, out the opening 20, and up through the external passage 30, where it is released into the second volume of gas through the external vent passages 32. Those of ordinary skill in the art will recognize that the vent 10 will "open" for a release of gas from the first volume to the second volume when either a sufficient positive pressure is exerted by the first volume, or when a sufficient negative pressure is exerted by the second volume, drawing the liquid 100 from the internal passage 19 and exposing the opening 20.

Figure 5:
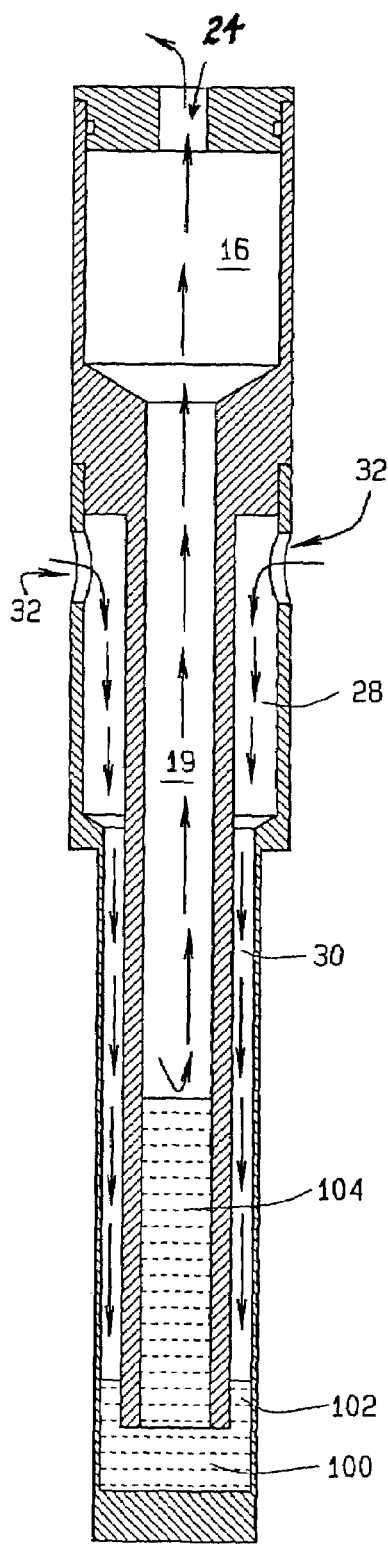
FIG. 5 is a sectional view of the valve of FIG. 1, illustrating the valve in-use in a closed arrangement a low negative pressure.
Figure 6:
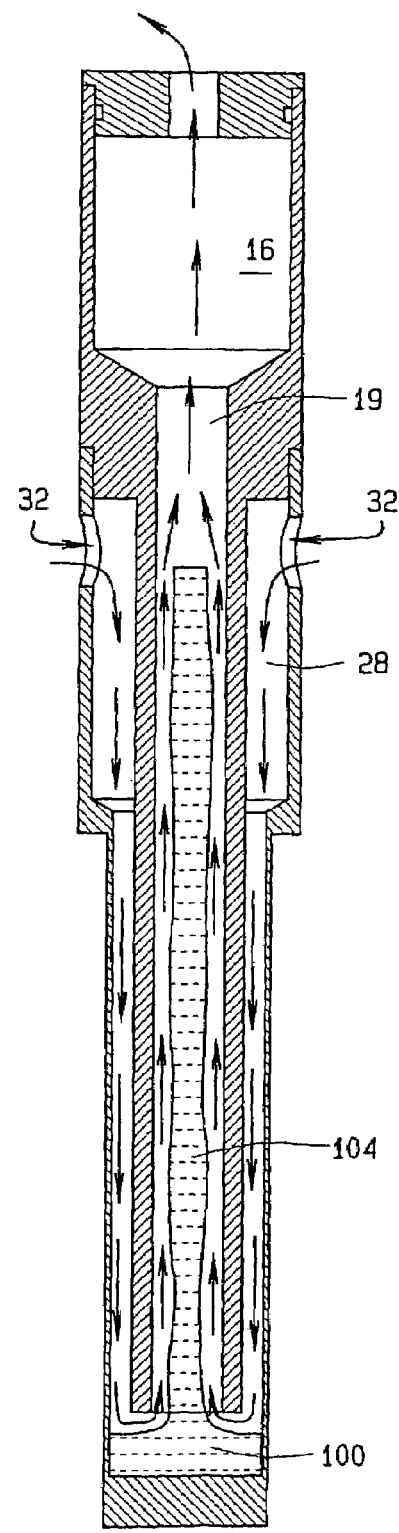
FIG. 6 is a sectional view of the valve of FIG. 1, illustrating the valve in-use in an open configuration at a low negative pressure.

Turning next to FIGS. 5 and 6, the opening of the vent 10 for the reverse flow of gas, from the second volume of gas to the first volume of gas is illustrated. As the negative pressure exerted upon the liquid column 104 by the first volume of gas in communication with the internal passage 19 through vent passage 24 decreases, the height of the liquid column 104 increased within the internal passage 104. As the height of liquid column 104 increases, the height of liquid column 102 within the external passage 30 decreases. When the negative pressure is sufficient to evacuate all of the liquid 100 from the external passage 30, the vent is "open" and gas is drawn from the second volume through the external passage 30, into the opening 20, and through the internal passage 19 where it is released into the first volume of gas through the vent passages 24. The flow of gas will continue so long as sufficient negative pressure remains in the first volume of gas to evacuate the liquid 100 from the external passage 30.

Those of ordinary skill in the art will recognize that the vent 10 will "open" for a release of gas from the second volume to the first volume when either a sufficient negative pressure is exerted by the first volume, or when a sufficient positive pressure is exerted by the second volume, drawing the liquid 100 from the external passage 30 and exposing the opening 20.

The specific operational parameters of a pressure/vacuum vent 10 of the present invention can be selected by utilizing a liquid 100 having known properties and by configuring the dimensions of the internal passage 19 and external passage 30. In a preferred embodiment, the liquid 100 is water, however, those of ordinary skill in the art will recognize that alternative liquids, such as mercury, having desired characteristics may be utilized. By selecting the dimensions of the internal and external passages, together with a predetermined volume of the liquid 100, the vent 10 can be configured to "open" at desired positive and negative pressure levels. Specifically, the dimensions of the internal passage 19 can be selected such that the liquid 100 will be completely evacuated from the internal passage 19 at a positive pressure equivalent to 3.0 inches of water as measured in the internal expansion chamber 16. Correspondingly, the external passage 30 can be configured with dimensions such that the liquid 100 will be completely evacuated from the external passage 30 at a negative pressure of 8.0 inches of water as measured in the internal expansion chamber 16.

Those of ordinary skill in the art will recognize that by altering the dimensions of the internal passage 19 and the external passage 30, such that the contained volume of liquid in each is varied, the vent 10 can be designed to "open" at two predetermined pressure levels, and will remain "closed" at all other pressure levels, as the liquid 100 present in the passages will prevent the flow of gas between the first and second gas volumes.

It will be further noted that the pressure/vacuum vent 10 of the present invention is particularly suited for use in the venting of closed fuel storage tanks. Excess fuel vapor pressure must be released to the atmosphere when it exceeds a predetermined level, and conversely, air must be drawn into the tank to prevent the development of a vacuum upon the removal of liquid fuel from the tank, thereby aiding in the removal of the liquid.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed:

1. A pressure/vacuum vent for use in venting a closed fuel storage tank, comprising:

a first chamber in communication with a first volume of gas having first pressure;

a second chamber in communication with a second volume of gas having a second pressure;

an internal passage provided in said first chamber, and an external passage provided in said second chamber, said external passage in fluid communication with said internal passage;

said first chamber and said second chamber are cylindrical, said first chamber and said second chamber are concentrically disposed, and said internal passage and said external passage are vertically oriented, and provide dual vent communicating passages for the closed fuel storage tank;

a predetermined volume of a known liquid disposed within said first and second chambers;

said internal passage has a volume selected to receive a column of said predetermined known liquid evacuated from said external passage at a predetermined negative pressure of said first volume of gas;

said external passage has a volume selected to receive a column of said predetermined volume of said known liquid evacuated from said internal passage at a predetermined positive pressure of said first volume of gas;

said first chamber includes an upper cylindrical body, and an integral tubular extension extending downwardly therefrom;

said second chamber comprising a first portion formed as a sleeve providing an external expansion chamber, and integrally having a tubular portion extending downwardly therefrom, said tubular extension of said first chamber extending concentrically downwardly within the tubular portion of the second chamber, said cylindrical body of the first chamber having an internal expansion chamber formed therein, and a first portion sleeve of the second chamber having an expansion chamber formed therein;

whereas, when the predetermined negative pressure and predetermined positive pressure of the volume of gas are exceeded, the closed fuel storage tank is vented; and wherein one of said chambers is in communication with the atmosphere, and said closed fuel storage tank is vented to the atmosphere upon select predetermined pressures; and wherein said first portion of the second chamber at its upper end connecting with the cylindrical body of the first chamber when assembled, and said first portion sleeve of the second chamber having at least one vent passage provided therethrough.

2. The pressure/vacuum vent of claim 1 wherein said known liquid is silicon oil.

3. The pressure/vacuum vent of claim 1 wherein said second chamber is in communication with the atmosphere.

* * * * *